United States Patent
Popp et al.

(10) Patent No.: US 10,245,647 B2
(45) Date of Patent: *Apr. 2, 2019

(54) TOOL HOLDING FIXTURE

(71) Applicant: Haimer GmbH, Igenhausen (DE)

(72) Inventors: Konrad Popp, Augsburg (DE); Johann Elges, Gersthofen (DE); Renee Hedrich, Augsburg (DE); Robert Merk, Lamerdingen (DE); Jurgen Klinger, Emersacker (DE)

(73) Assignee: Franz Haimer (DE)

( * ) Notice: Subject to any disclaimer, the term of this patent is extended or adjusted under 35 U.S.C. 154(b) by 2 days.

This patent is subject to a terminal disclaimer.

(21) Appl. No.: 14/904,786

(22) PCT Filed: Jul. 31, 2014

(86) PCT No.: PCT/EP2014/066466
§ 371 (c)(1),
(2) Date: Jan. 13, 2016

(87) PCT Pub. No.: WO2015/014925
PCT Pub. Date: Feb. 5, 2015

(65) Prior Publication Data
US 2016/0158847 A1    Jun. 9, 2016

(30) Foreign Application Priority Data
Jul. 31, 2013  (DE) ........................ 10 2013 108 209

(51) Int. Cl.
| F16B 4/00 | (2006.01) |
| B23P 11/02 | (2006.01) |
| B23B 31/117 | (2006.01) |

(52) U.S. Cl.
CPC ........ *B23B 31/1179* (2013.01); *B23B 31/117* (2013.01); *B23P 11/025* (2013.01);
(Continued)

(58) Field of Classification Search
CPC .. B23B 31/117; B23B 31/1179; B23P 11/025; F16B 4/006; Y10T 29/49865; Y10T 279/17111; Y10T 279/17957
See application file for complete search history.

(56) References Cited

U.S. PATENT DOCUMENTS

| 4,348,844 A | * | 9/1982 | Schupack | ................. E04C 5/12 52/223.13 |
| 4,502,703 A | | 3/1985 | Rohm | |

(Continued)

FOREIGN PATENT DOCUMENTS

| DE | 8210066 | 11/1982 |
| DE | 9900610.8 | 7/1999 |

(Continued)

OTHER PUBLICATIONS

International Search Report, completed on Oct. 6, 2014, International Application No. PCT/EP2014/066466.

(Continued)

*Primary Examiner* — Eric A Gates
(74) *Attorney, Agent, or Firm* — Michael P. Mazza, LLC

(57) ABSTRACT

The invention relates to a tool holding fixture (1) for rotationally driven tools (2), said tool holding fixture comprising a rotationally symmetrical holding body (3) which has a front clamping portion (4) having a holding opening (5) for a tool shaft (6) of the tool (2), and a rear holding portion (7) to be held in a work spindle of a machine tool. To achieve a reduced mass, a lower mass moment of inertia and at the same time high stiffness, a sleeve (11) consisting of a fiber-reinforced plastic is arranged at least in the front clamping portion (4).

22 Claims, 3 Drawing Sheets

(52) U.S. Cl.
CPC ........ *F16B 4/006* (2013.01); *B23B 2226/275* (2013.01); *B23B 2231/24* (2013.01); *B23B 2240/28* (2013.01); *Y10T 29/49865* (2015.01); *Y10T 279/17111* (2015.01); *Y10T 279/17957* (2015.01)

(56) References Cited

U.S. PATENT DOCUMENTS

| | | | | |
|---|---|---|---|---|
| 4,759,110 | A | * | 7/1988 | Rieger .................. B23P 11/025 285/381.1 |
| 4,930,205 | A | * | 6/1990 | Tasse .................... B23P 11/025 29/447 |
| 5,711,538 | A | * | 1/1998 | Retzbach .............. B23B 31/305 279/2.08 |
| 5,865,571 | A | | 2/1999 | Tankala |
| 7,959,387 | B2 | * | 6/2011 | Frota de Souza ...... B23B 31/02 279/103 |
| 8,286,972 | B2 | | 10/2012 | Haimer |
| 8,459,659 | B2 | | 6/2013 | Puppala |
| 9,366,277 | B2 | * | 6/2016 | Ingles ....................... F16B 4/00 |
| 9,623,494 | B2 | * | 4/2017 | Bozkurt ................ B23B 31/005 |
| 2009/0003947 | A1 | * | 1/2009 | Haimer ................... B23B 29/12 408/143 |
| 2012/0180299 | A1 | * | 7/2012 | Sharp .................... B23P 11/025 29/447 |
| 2017/0173704 | A1 | * | 6/2017 | Popp .................... B23B 31/1179 |

FOREIGN PATENT DOCUMENTS

| | | | | |
|---|---|---|---|---|
| DE | 102006016290 A1 | * | 10/2007 | ............ B23B 31/02 |
| JP | 10225032 A | * | 8/1998 | |
| WO | WO 2012025092 A2 | * | 3/2012 | ........... B23B 31/005 |

OTHER PUBLICATIONS

Franz Haimer, Written Opinion, International Application No. PCT/EP2014/063220, dated Jan. 5, 2016.

Haimer Gmbh, Written Opinion, dated Jan. 5, 2016.

\* cited by examiner

TOOL HOLDING FIXTURE

PRIORITY CLAIM

This application claims priority from German Patent Application No. 10 2013 108 209.2 filed Jul. 31, 2013, and International Patent Application PCT/EP2014/066466 filed Jul. 31, 2014.

BACKGROUND OF THE INVENTION

The invention relates to a tool holding fixture for rotationally driven tools.

Tool holding fixtures of this type are used as an interface between a rotationally driven tool and a work spindle of a machine tool. They are supposed to allow the tools to be held precisely in position for machining with hid accuracy and quick tool changes. The tool holding fixtures, known from the prior art, typically comprise a holding body that is made of steel and that includes a front clamping region with a receiving opening for a tool shank of the tool and a rear holding region to be held in a work spindle of a machine tool. Depending on the clamping system, the rear holding region may be designed in different ways. However, since the holding body, made of steel, has to have certain dimensions in order to achieve the required rigidity, the known tool holding fixtures also have a relatively high mass and a correspondingly high mass moment of inertia. Therefore, the drives and tool changing systems must also be dimensioned accordingly.

The object of the present invention is to provide a tool holding fixture that exhibits the same stiffness, but a significantly reduced mass and a lower mass moment of inertia.

This engineering object, as well as practical further developments and advantageous embodiments, are achieved using the tool holding fixture recited in the below claims, and as further discussed in this application.

SUMMARY OF THE INVENTION

In the case of the tool holding fixture according to the invention, a sleeve, made of a carbon fiber reinforced plastic (CFRP), a glass fiber reinforced plastic (GFRP) or any other fiber reinforced plastic, is disposed in at least the front clamping region. The sleeve consists expediently of several layers of fiber having a fiber orientation according to the power flows that are generated by rotation, clamping and machining forces. This sleeve is relatively light weight and yet can still ensure high rigidity and stability of the tool holding fixture. Hence, the steel mass, which is used in conventional tool holding fixtures for stabilization, may be at least partially replaced, so that the result is a significant reduction in weight and a significant decrease in the mass moment of inertia of the tool holding fixture. In the case of shrink fit chucks this feature allows the weight of the tool holding fixture to be reduced by as much as 50% and the mass moment of inertia to be decreased by as much as 60% over equivalent steel constructions. The result is that a number of components of a machine tool can profit at once from this feature. Thus, when interchanging and exchanging the tool holding fixture at the work spindle, the active inertial forces are smaller, a feature that protects both the work spindle with its bearing arrangement and also the holder. Due to the reduced mass the impact forces are also smaller when interchanging the tool holding fixture, a feature that has a positive effect on the wear. In addition, smaller drive forces are required for the linear movement and the acceleration of the tool holding fixture, so that the drive requires less drive power, and the productivity of the machine tool can be increased. The drive is also forced to cope with smaller braking forces and, thus, has to manage with a lower cooling capacity and less energy input. In particular, the reduced mass moment of inertia also makes it possible to provide faster speed changes and, thus, to speed up the start and stop operations of the spindle.

The use of fiber reinforced plastics in tool holding fixtures also has a positive impact on the tool changing operation. Due to the smaller masses to be moved, the tool changing operation can be carried out more quickly; and smaller forces are required to move the tool changer and the tool, magazine. As a result, the life of the entire tool changing system can be extended.

In addition to the positive effects on the machine side, the fiber sandwich structure of a tool holding fixture can also lead to an enhancement of the quality on the workpiece side. Due to the smaller oscillating masses, the unbalance can be reduced, and the concentricity of the tools can be improved. This feature helps to increase the service life of the tool and to improve the surface quality. Moreover, the sleeve, made of fiber reinforced plastic, can improve the damping properties of the tool holding fixture, a feature that can reduce the vibrations in critical areas and can have a positive effect on the surface quality.

The tool holding fixture can be designed as a shrink fit chuck with the fiber reinforced plastic sleeve being mounted on the front clamping region of the holding body made of metal. Due to the limited thermal load capacity of such a sleeve the shrinking process for fixing the tools is reversed, here, as compared to conventional shrink fit chucks. Instead of heating the tool holding fixture for holding the tools, the tools are cooled down prior to insertion into the tool holding fixture.

The sleeve, made of fiber reinforced plastic, can be shrunk onto the front clamping region of the holding body made of metal. For this purpose the holding body can be cooled down before the sleeve is mounted. When the holding body is then reheated, the sleeve is held by a press fit. The sleeve can also be removed or replaced by cooling it down again, when, for example, a sleeve having other dimensions or properties is to be used. However, the sleeve could also be glued on or attached in some other appropriate manner to the holding body.

In another useful embodiment the sleeve, made of fiber reinforced plastic, can form the front clamping region and at least one portion of a central region of the holding body. Only the more highly stressed parts, such as, for example, the rear holding region, an outer portion of the central region and a cover member on the front end face of the holding body may be made of steel.

Conceivable are also embodiments, in which the entire outside of the tool holding fixture is designed as a sleeve made of a fiber reinforced plastic. The holding body may consist, for example, of a thin-walled metal insert that is completely enclosed by a sleeve forming the entire outer contour of the tool holding fixture.

The tool holding fixture, which is provided with a sleeve made of fiber reinforced plastic, does not necessarily have to be designed as a shrink fit holder, but rather can also be configured as a Weldon holder, as a collet chuck with a collet or, for example, as a clamping holder, with the front clamping region being radially deformed by a clamping element, surrounded by a sleeve made of fiber reinforced plastic. The clamping element may be designed in such a way that the front clamping region is compressed in the region of the receiving opening by means of an axial movement of the clamping element in order to clamp the tool or is opened to release the tool. The clamping element may be, for example, a clamping bushing, which is axially displaceable on a conical front portion of the front clamping region and which comprises a conical inner surface that is adapted to the conical outer surface of the front portion. The axial adjustment of the clamping element can be carried out by an adjusting ring that is designed as an inner threaded ring and that interacts with an outer thread on the clamping element and with an outer thread on a rear portion of the clamping region, with the rear portion having an enlarged diameter. However, the axial displacement of the clamping element can also be carried out by means of other adjustment options.

However, the front clamping region can also consist of multiple parts, i.e., can be constructed in a modular design. In a first embodiment the holding body and the sleeve are formed at the end of the front clamping region in such a way that they form the support surfaces/abutment surfaces for a screw-in tool. In a particularly preferred embodiment these support surfaces/abutment surfaces are designed as a double cone with different cone angles; and the holding body has in the front clamping region an inner thread that is adapted to receive the outer thread of the screw-in tool.

In an additional embodiment the front clamping region with at least one other module is constructed of several parts. Ideally both the holding body and the sleeve have suitable support surfaces. However, in an alternative embodiment the sleeve can also extend beyond the holding body and form the sole holder for the module. It goes without saying that a suitable module has abutment surfaces, corresponding to the support surfaces. Such a module may be, for example, a shrink fit holder or hydraulic chuck.

If the tool holding fixture is assembled in such a modular design, then there is also the additional option of putting the sleeve under axial tension. This feature makes it possible to damp even more the vibration of the tool holding fixture in RUN mode. The attachment of a module, preferably by means of a threaded joint, allows the sleeve to be put under axial tension by screwing into a holding fixture with clamping space for a tool in the holding body. By applying axial tension, it is possible to change, in particular, to increase in a targeted way the spring stiffness of the tool holding fixture in its entirety as well as the associated vibration modes, which are especially easy to excite at the tool holding fixture, and their associated resonance frequencies.

As is well-known, the resonant frequency of a component, such as, for example, a tool holding fixture, is determined from the square root of the quotient of the spring stiffness and the mass. By specifically modifying the spring stiffness, it is also possible to have a specific impact on both the torsional vibration behavior (i.e., regarding a vibration of the tool holding fixture about an axis of rotation) and the transverse vibration behavior (i.e., regarding a vibration of the tool holding fixture in a plane, containing the axis of rotation, with a vibration deflection of the tool holding fixture orthogonally to the axis of rotation), it has also been shown that in the event of high mechanical stresses in the elastic region of metallic materials the damping may increase in the individual case.

Moreover, the fiber reinforced plastic sleeve may include various arrangements of cavities that have a positive effect on the damping behavior. These cavities can occur, for example, due to voids, introduced in the winding process, or a layer of (laser) sintered material positioned between the windings. A particularly advantageous distribution of the cavities is an arrangement, in which they are located on at least two, preferably three imaginary cylindrical or conical surfaces that are arranged coaxially one inside the other.

A coolant conducting system can also be incorporated in the sleeve in a manner analogous to the cavities. Since the coolant channels do not have to be drilled in such a system, but rather are already incorporated during production, their shape is not specified. As a result, the course of the coolant channel can consist of various straight and/or curved sections, in order to form, for example, an S-shaped course or to "meander" in the axial direction. It is also possible that the coolant channel "spirals" upwards in a spiral around the axis of rotation of the tool holding fixture inside the sleeve.

In an alternative embodiment the coolant conducting system can also be subsequently incorporated in the sleeve, In so doing, the course of the coolant channel or the coolant channels is exposed on the inner side, abutting the holding body 3, by means of a material-removing method. These coolant channels are later defined through contact with the metallic holding body. Such a coolant conducting system has the advantage that the clamping section and, thus, the tool shank are more than just marginally cooled, in particular, in the case of a spiral course.

In order to conduct the coolant from the rear holding region 7 into the sleeve, the tool holding fixture has a coolant guide from the rear holding region into the front holding region as well as a breakthrough of the holding body 3 in the front holding region 4, which is connected to the sleeve 11.

In order to be able to attach the sleeve 11 more easily, the holding body in one advantageous embodiment can have guide surfaces or similar elements to facilitate the positioning in the best possible way. Such a guide surface may be, for example, a flattened mating surface on the otherwise round outside diameter of the holding body 3, which finds its corresponding counter surface in the sleeve 11. Such a measure also ensures that the connecting points provided as a breakthrough in the receiving state and a connecting point of the coolant conducting system in the sleeve impinge upon each other.

In order to improve the cohesion of the sleeve and the holding body, it is advantageous to increase the friction forces between the metal and the fiber reinforced plastic. The easiest way to achieve this feature is to roughen the metal surface or to introduce suitable materials, such as, for example, rubber, into the fiber reinforced plastic.

The sleeve, which is used as a reinforcing sleeve, may be made preferably of a synthetic plastic material that is reinforced with carbon fibers, glass fibers or aramid fibers.

BRIEF DESCRIPTION OF THE DRAWINGS

Additional features and advantages of the invention will become apparent from the following description of preferred exemplary embodiments with reference to the drawings. The drawings show in.

DETAILED DESCRIPTION OF PREFERRED EMBODIMENTS

Figure 1:
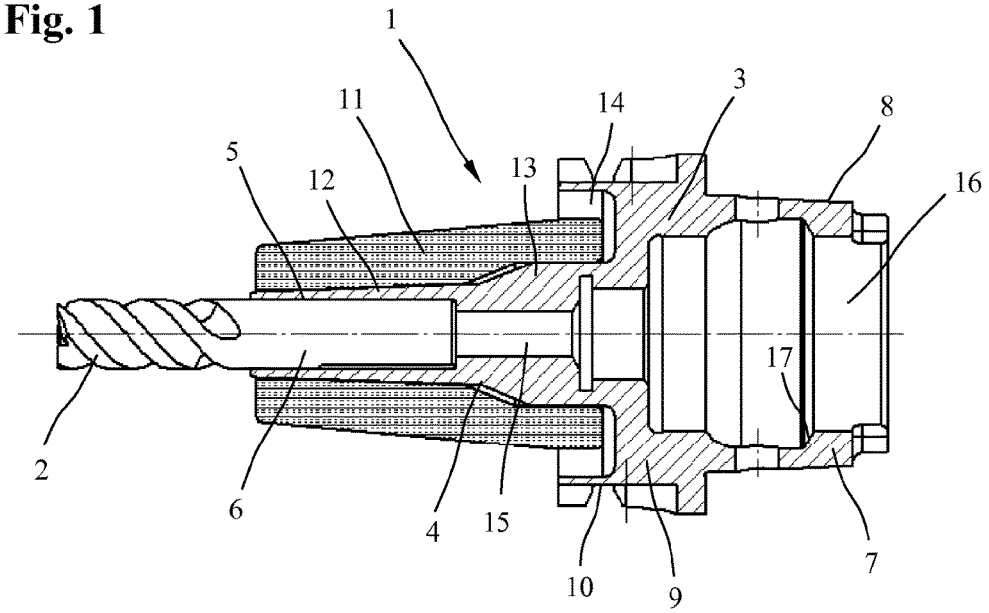
FIG. 1 a first exemplary embodiment of a tool holding fixture in a longitudinal view.

FIG. 1 shows a tool holding fixture 1, which is provided in this embodiment with an FISK interface, for non-positive holding of drilling, milling, reaming tools or any other rotationally driven tools 2, in the embodiment shown, the tool holding fixture 1 is designed as a thermal chuck and includes a rotationally symmetrical holding body 3, which on its tool-sided front end has a damping region 4 with a receiving opening 5 for a tool shank 6 of the tool 2 and on its machine-sided rear end has a rear holding region 7, which is conical in this embodiment and has a conical outer clamping surface 8 to be held in a work spindle of a machine tool. Furthermore the holding body 3, made of steel, also has a cylindrical central region 9 with a gripper groove 10 for engagement with a tool changer. A sleeve 11, made of a carbon fiber reinforced plastic (CFRP) or any other fiber reinforced plastic, is disposed on the front clamping region 4 of the holding body 3.

In the embodiment shown in FIG. 1, the CFRP sleeve 11 is arranged by means of a press fit on the front clamping region 4 of the holding body 3 made of metal. In order to mount the CFRP sleeve 11, the holding body 3 is cooled down to, for example, −180 deg. C. Then the sleeve 11, which is at room temperature, can be mounted on the front clamping region 4 that contracts due to it cooling down. If the holding body 3 is reheated and, as a result, expands, the sleeve 11 is fixed. At the same time the ratio of the inside diameter of the sleeve 11 to the outside diameter of the front clamping region 4 is selected in such a way that the sleeve 11 is held firmly under radial prestress on the front clamping region 4, when, having cooled down, the holding body 3 is heated again to room temperature and expands radially.

As an alternative or in addition to the formation of a press fit, the holding body 3 and the sleeve 11 may be connected to each other by means of a form fit. In a preferred embodiment the holding body 3 has irregularities, for example, in the form of radially outwardly directed lamellae, into which the sleeve 11 is pressed. In this way a positive connection can be achieved through an elastic deformation of the components. The sleeve 11 has preferably recesses, which correspond to the irregularities of the holding body 3 and which enter into a positive engagement with each other as early as in the unstressed state.

In another preferred embodiment the sleeve is not slid on as a prefabricated element, but rather is applied in several layers in a wrapping process. For this purpose the holding body 3 has in its clamping region 4 preferably a plurality of needle-shaped and/or pin-shaped elements, which are firmly connected to the holding body and which penetrate into the sleeve during the wrapping process and, in so doing, produce a very stable composite that in the ideal state has enhanced damping properties. It will be clear to the person skilled in the art that the term "wrapping process" includes a plethora of methods, known from the prior art, such as, for example, weaving, and, in particular, braiding a sleeve of more than one web of fiber reinforced plastic.

As shown in FIG. 1, the front clamping region 4 is made relatively slim and thin walled compared, to the outside diameter of the sleeve 11. In this embodiment the clamping region 4 includes a slightly conical, slender front portion 12 with the receiving opening 5, disposed therein, for the tool shank 6 and a widened rear portion 13. The sleeve 11 extends over the slimmer front portion 12, the widened rear portion 13 and engages with a recess 14 on the front end face of the cylindrical central region 9 of the holding body 3. In the embodiment shown, the tool holding fixture 3 has a continuous opening 15 with an expanded rear cavity 16 in the rear holding region 7. On the inside of the cavity 16 there are clamping surfaces 17 for collets or other clamping elements for internal clamping of the tool holding fixture 1 in a work spindle.

In contrast to conventional thermal chucks, in which the tool holding fixture 1 is first heated in order to clamp the tools and then has to be cooled down again, in this case for clamping purposes the tool 2 is first cooled down inside the tool holding fixture 1. When the diameter of the tool shank. 6 has decreased due to it cooling down, the tool 2 can be inserted into the receiving opening 5. If, after insertion, the tool 2 reaches room temperature again and, in so doing, expands again, then the tool shank 6 is fixed in the receiving opening 5. In this case, too, the ratio of the inside diameter of the receiving opening 5 to the outside diameter of the tool shank 6 is selected in such a way that the tool 2 is firmly held in the receiving opening 5 of the tool holding fixture 1 at the standard operating temperatures.

In order to release the tool 2, the entire unit consisting of tool holding fixture 1 and tool 2 is cooled down. Depending on the fiber orientation, the inside diameter of the sleeve 11 remains virtually unchanged. At the same time the thin-walled front portion 12 forms with the sleeve 11 an interference fit assembly: in other words, is under radial prestress from the outside. Although the cooling down process in the front portion 12 leads to a reduction in the volume, once the pre-stress is relaxed, the effect is that the receiving opening 5 becomes smaller. Since the diameter of the tool shank 6 is decreased by the cooling process, the diameter of the receiving opening 5 remains the same, the tool 2 can be removed.

Figure 2:
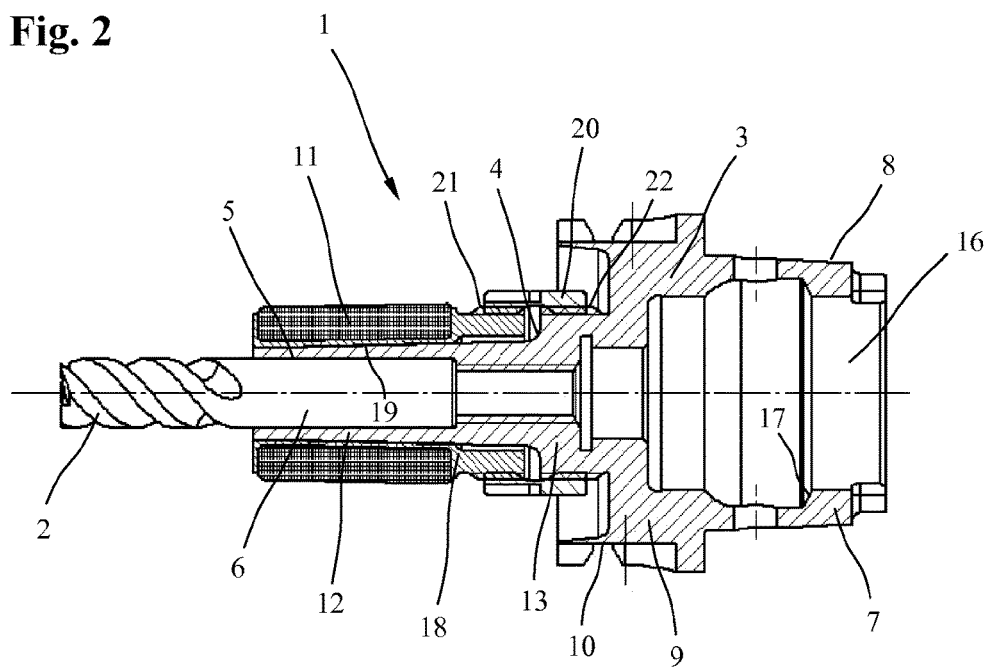
FIG. 2 a second exemplary embodiment of a tool holding fixture in a longitudinal view.

FIG. 2 shows an additional embodiment of a tool holding fixture 1. This tool holding fixture 1 comprises a holding body 3, which is made of steel and which has a front clamping region 4 for damping the tool 2; and a rear holding region 7 to be held in a work, spindle of a machine tool. In this case, too, the front clamping region 4 is formed by a conical, slender front portion 12 and a rear portion 13 with a slightly enlarged diameter. However, in this embodiment the tool 2 is not clamped by shrinking, but rather by radial compression of the conical, slender front portion 12. The radial compression of the front portion 12 is carried out by a clamping element 18 that can be axially displaced on the front portion 12. The clamping element 18, which is designed as a clamping bushing in this embodiment, can be axially adjusted relative to the holding body 3 and has a conical inner surface 19 that is adapted to the conical outer surface of the front portion 12. The bushing-shaped clamping element 18 that is also thin walled in the front region, comprises on its outside a sleeve 11, which is made of CFRP or any other fiber reinforced plastic and which is also used for reinforcement.

The axial adjustment of the clamping element 18, surrounded by the sleeve 11, relative to the holding body 3 is carried out by an adjusting ring 20, which is designed as a threaded ring. Said adjusting ring interacts with an outer thread 21 on the clamping bushing 18 and with an outer thread 22 on the rear portion of the clamping region 4, with the rear portion having a diameter that is enlarged compared to the front portion 12. The two outer threads have different slopes, so that by rotating the adjusting ring 20, the bushing-shaped clamping element 18 can be moved either to the rear in the direction of the holding region 7 in order to clamp the tool 2 or can be moved to the front in order to release the tool 2. The axial adjustment of the clamping element 18 can be carried out in the manner of a turnbuckle with a right and left hand thread or by means of similar adjustments.

Figure 3:
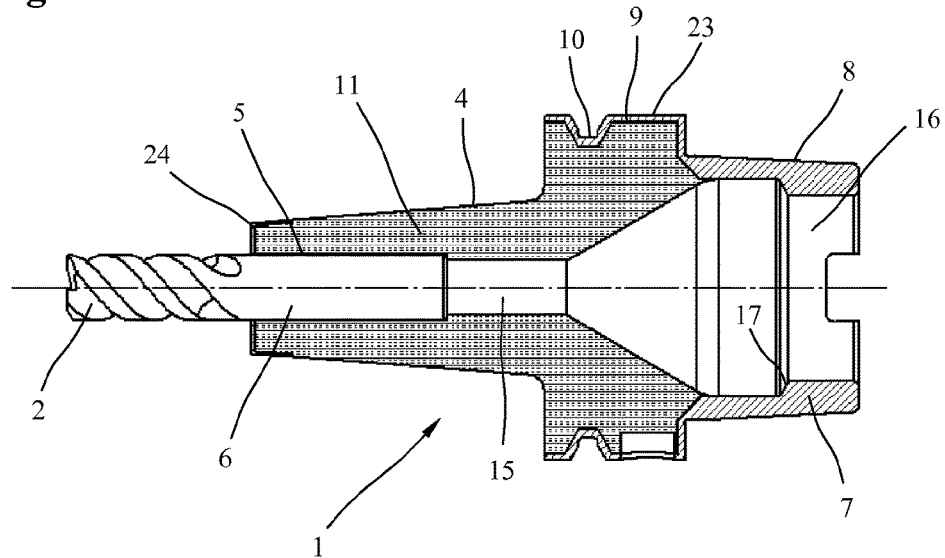
FIG. 3 a third exemplary embodiment of a tool holding fixture in a longitudinal view.

In the embodiment shown in FIG. 3, almost the entire front clamping region 4 and also a large part of the cylindrical central region 9 is formed by a sleeve 11, made of CFRP or any other fiber reinforced plastic. In this embodiment only the holding region 7, which is highly stressed upon insertion of the tool holding fixture into the work spindle 1; an outer portion 23 of the cylindrical central region 9; and a cover member 24, disposed on the front end face of the tool holding fixture, are made of steel. This tool holding fixture 1 is also designed as a thermal chuck, in which the tool 2 is cooled down for insertion.

In order to increase the friction between the tool shank 6 and the sleeve 11, both the outer surface of the tool shank 6 and the inner surface of the sleeve 11 can be processed. This processing can be done, for example, by mechanically or chemically roughening the surfaces or by applying a coating. It goes without saying that similar methods can be used to connect the base body 3 and the sleeve 11 to each other.

Figure 4:
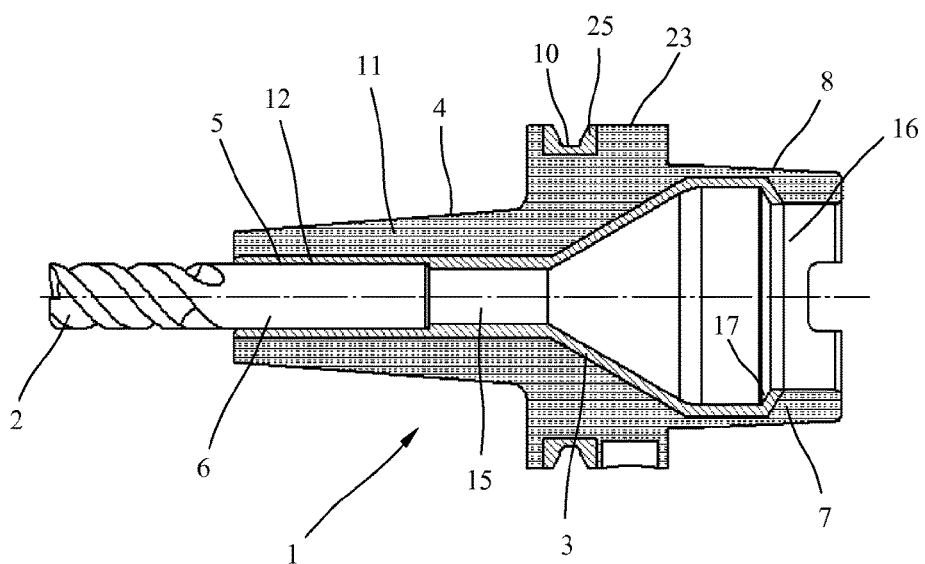
FIG. 4 a fourth exemplary embodiment of a tool holding fixture in a longitudinal view.

FIG. 4 shows another exemplary embodiment of a tool holding fixture 1 that is provided with a sleeve 11 made of fiber reinforced carbon. In this embodiment the holding body 3 consists of a thin-walled insert that is made of metal, which is completely enclosed by a sleeve 11 that is made of fiber reinforced carbon and that forms the entire outer contour of the tool holding fixture 1. The outer contour of the front clamping region 4 and also the outer contour of the rear holding region 7 are formed by the sleeve 11. The holding body 3, which is designed as an insert, also has a slender, thin-walled front portion 12 with a receiving opening 5 for a tool shank 6 of a tool 2. Inserts 25, which are made of metal, can be embedded on the outside of the sleeve 11, in order to form the gripper groove 10.

Figure 5:
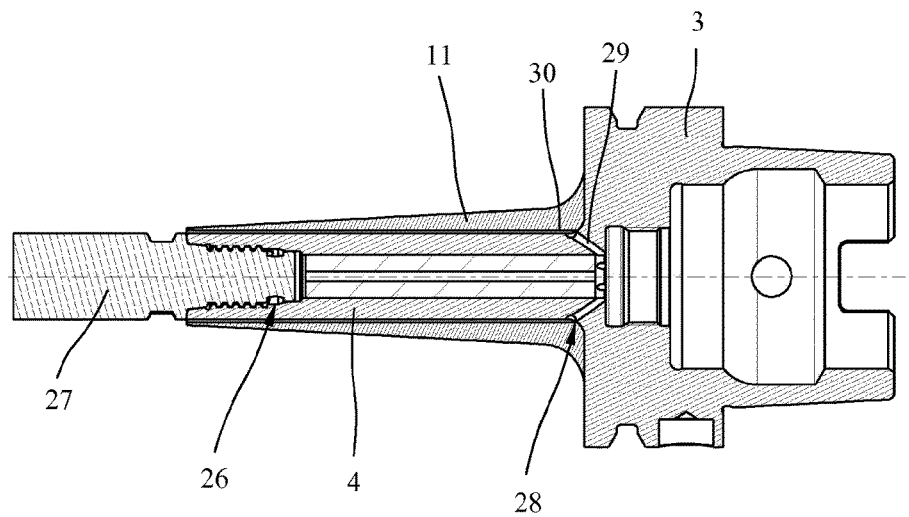
FIG. 5 a fifth exemplary embodiment of a tool holding fixture in a longitudinal view.

In the embodiment shown in FIG. 5, the holding body 3 has in the front clamping region 4 a receptacle 26 for a screw-in tool 27. The receptacle 26 is designed as a double cone in the embodiment shown. The holding body 3 and/or the sleeve 11 is/are provided with a coolant conducting system 28 in the form of boreholes 29, passages 30, grooves, gaps, or the like.

Figure 6:
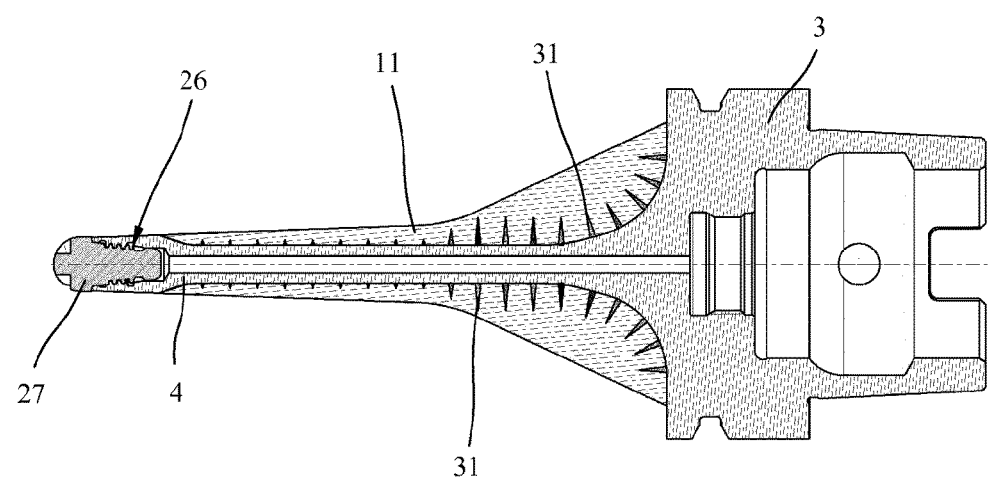
FIG. 6 a sixth exemplary embodiment of a tool holding fixture in a longitudinal view.

In the embodiment of FIG. 6, the sleeve 11 is applied by means of a wrapping process. The front damping region 4 of the holding body 3 has a plurality of needle-shaped and/or pin-shaped elements 31, which penetrate into the sleeve 11 during the winding process. In this embodiment, too, the holding body 3 in the front clamping region 4 comprises a receptacle 26, designed, for example, as a double cone, for a screw-in tool 27.

In other embodiments, which are not shown separately herein, the tool holding fixture 1 may also be designed as a Weldon tool holder or as a collet chuck. It goes without saying that the invention is not restricted to HSK tool holding fixtures. It is also possible to provide SK, JIS, BT, ABS, Capto or other suitable interfaces in a corresponding manner on the holding body 3.

The invention claimed is:
1. A method for making a tool holding fixture (1) with a rotationally symmetrical holding body (3) and a sleeve (11), wherein the tool holding fixture (1) has a front clamping region (4) with a receiving opening (5) for accepting a tool shank (6) of a rotationally driven tool (2), and a rear-holding region (7) retained in a work spindle of a machine tool, comprising the steps of:

forming the holding body (3) to include at least the rear-holding region (7), wherein the holding body (3) comprises metal and has a metal surface;

forming the sleeve to constitute the front clamping region (4) and at least a portion of a central region (9) of the tool holding fixture (1), wherein the sleeve comprises fiber-reinforced plastic;

roughening the metal surface of the holding body in order to improve cohesion between the sleeve and the holding body (3); and mounting and shrinking the sleeve (11) onto the front-clamping region (4) of the holding body (3) to produce a frictional connection between the holding body (3) and the sleeve (11).

2. The method for making a tool holding fixture of claim 1, further comprising the steps of constructing the tool holding fixture (1) in several parts in a modular design.

3. The method for making a tool holding fixture (1) of claim 2, further comprising the step of axially prestressing the sleeve (11) using at least one additional module.

4. The method for making a tool holding fixture (1) of claim 1, wherein the sleeve (11) comprises a coolant conducting system (28).

5. The method for making a tool holding fixture of claim 4, wherein the coolant conducting system (28) comprises a coolant channel having a course that is composed partly of straight and curved regions.

6. The method for making a tool holding fixture of claim 4, wherein the coolant conducting system (28) is at least partially defined by the holding body (3) and the sleeve (11).

7. The method for making a tool holding fixture of claim 1, wherein the rear holding region (7), an outer portion (23) of the central region (9), and a cover member (24) on the front end face of the holding body (3), comprise steel.

8. The method for making a tool holding fixture of claim 1, wherein the holding body (3) comprises a thin-walled insert, and further comprising the step of completely enclosing the holding body (3) by the sleeve (11), thereby forming the entire outer contour of the tool holding fixture (1).

9. The method for making a tool holding fixture of claim 1, wherein the holding body (3) or the sleeve (11) has a receptacle (26) for threadably accepting a tool (27).

10. The method for making a tool holding fixture of claim 1, wherein the receptacle (26) is designed as a double cone.

11. The method for making a tool holding fixture of claim 1, wherein the front-clamping region (4) is radially deformable by a clamping element (18) surrounded by the sleeve (11).

12. The method for making a tool holding fixture of claim 11, wherein the clamping element (18) is designed as a clamping bushing that can be axially displaced on a conical front portion (12) of the front-clamping region (4) and has a conical inner surface (19) that is adapted to the conical outer surface of the front portion (12).

13. The method for making a tool holding fixture of claim 11, wherein the clamping element (18) is adjustable by means of an adjusting ring (20), designed as an inner threaded ring.

14. The method for making a tool holding fixture of claim 13, wherein the adjusting ring (20) interacts with an outer thread (21) on the clamping element (18) and with an outer thread (22) on a rear portion (13) of the front-clamping region (4), with the rear portion (13) having an enlarged diameter.

15. The method for making a tool holding fixture of claim 1, further comprising the step of forming one or more cavities in an interior of the sleeve (11).

16. The method for making a tool holding fixture of claim 15, further comprising the step of forming the one or more interior sleeve cavities as a layer by a sintering process, wherein the one or more interior sleeve cavities extend longitudinally to an axis of rotation of the fixture, between two regions made of fiber-reinforced plastic.

17. The method for making a tool holding fixture of claim 1, further comprising the step of making the sleeve (11) out of a plastic, reinforced with carbon fibers, glass fibers or aramid fibers.

18. A method for making a tool holding fixture (1) with a rotationally symmetrical holding body (3) and a sleeve (11), wherein the holding body (3) has a front clamping region (4) with a receiving opening (5) for accepting a tool shank (6) of a rotationally driven tool (2), and a rear-holding region (7) retained in a work spindle of a machine tool comprising the steps of:
- forming the holding body (3) to include at least the rear-holding region (7);
- forming the sleeve from fiber-reinforced plastic; and
- applying the sleeve (11) to the holding body (3) using a wrapping or braiding process, wherein the front-clamping region (4) has a plurality of needle-shaped or pin-shaped elements (31) that penetrate into the sleeve (11) during the wrapping or braiding process.

19. A method for making a tool holding fixture (1) including a sleeve (II) for rotationally driven tools (2), comprising the steps of:
- providing a rotationally symmetrical holding body (3), the holding body (3) comprising a metal surface and has: (a) a front-clamping region (4) with a receiving opening (5) for a tool shank (6) of the tool (2), and (b) a rear-holding region (7) capable of attachment to a work spindle of a machine tool, wherein the metal surface of the holding body is roughened in order to improve cohesion between the sleeve and the holding body;
- mounting and shrinking the sleeve (11) onto the front-clamping region (4) of the holding body (3) to produce a positive connection between the holding body (3) and the sleeve (11), wherein the sleeve is made of a fiber-reinforced plastic and comprises a coolant conducting system (28) with a coolant channel having a course that is composed partly of straight and curved regions and at least partially defined by the holding body (3) and the sleeve (11).

20. A method for making a tool holding fixture (1) including a sleeve (11) for rotationally driven tools (2), comprising the steps of:
- providing a rotationally symmetrical holding body (3), wherein the holding body (3) comprises a metal surface, and has: (a) a front-clamping region (4) with a receiving opening (5) for a tool shank (6) of the tool (2), and (b) a rear-holding region (7) capable of attachment to a work spindle of a machine tool;
- forming the front clamping region (4) and at least one portion of a central region (9) of the holding body (3), as the sleeve (11);
- roughening the metal surface of the holding body in order to improve cohesion between the sleeve (11) and the holding body (3); and
- mounting and shrinking the sleeve (11) onto the front-clamping region (4) of the holding body (3) to produce a positive connection between the holding body (3) and the sleeve (11), wherein the sleeve is made of a fiber-reinforced plastic.

21. A method for making a tool holding fixture (1) including a sleeve (11) for rotationally driven tools (2), comprising the steps of:
- providing a rotationally symmetrical holding body (3), wherein the holding body (3) comprises a thin-walled insert with a metal surface, and has: (a) a front-clamping region (4) with a receiving opening (5) for a tool shank (6) of the tool (2), and (b) a rear-holding region (7) capable of attachment to a work spindle of a machine tool;
- completely enclosing the holding body (3) within the sleeve (11) to thereby form the entire outer contour of the tool holding fixture (1);
- roughening the metal surface of the holding body in order to improve cohesion between the sleeve (11) and the holding body (3); and
- mounting and shrinking the sleeve (11) onto the front-clamping region (4) of the holding body (3) to produce a positive connection between the holding body (3) and the sleeve (11), wherein the sleeve is made of a fiber-reinforced plastic.

22. A method for making a tool holding fixture (1) including a sleeve (11) for rotationally driven tools (2), comprising the steps of:
- providing a rotationally symmetrical holding body (3), wherein the holding body (3) comprises a metal surface, and has: (a) a front-clamping region (4) with a receiving opening (5) for a tool shank (6) of the tool (2), and (b) a rear-holding region (7) capable of attachment to a work spindle of a machine tool;
- forming one or more cavities in an interior of the sleeve (11) as a layer by a sintering process, wherein the interior sleeve cavities extend longitudinally to an axis of rotation of the tool holding fixture, between two regions of the sleeve (11) made of fiber-reinforced plastic;
- roughening the metal surface of the holding body in order to improve cohesion between the sleeve (11) and the holding body (3); and
- mounting and shrinking the sleeve (11) onto the front-clamping region (4) of the holding body (3) to produce a positive connection between the holding body (3) and the sleeve (11), wherein the sleeve is made of a fiber-reinforced plastic.

* * * * *